(12) United States Patent
Allen

(10) Patent No.: US 6,658,965 B2
(45) Date of Patent: Dec. 9, 2003

(54) LEVER THROTTLE CONVERTER

(76) Inventor: Don A. Allen, 8916 Highway 282 North, Alma, AR (US) 72921

( * ) Notice: Subject to any disclaimer, the term of this patent is extended or adjusted under 35 U.S.C. 154(b) by 0 days.

(21) Appl. No.: 10/052,991

(22) Filed: Jan. 18, 2002

(65) Prior Publication Data

US 2003/0136215 A1 Jul. 24, 2003

(51) Int. Cl.$^7$ .............................. G05G 1/04; G05G 1/08
(52) U.S. Cl. .................... 74/526; 74/489; 74/551.8; 74/551.9; 74/504; 74/488; 74/480 R
(58) Field of Search ................. 74/543, 504, 502.2, 74/489, 488, 551.9, 551.8, 557, 558, 480 R, 526

(56) References Cited

U.S. PATENT DOCUMENTS

| | | | | | |
|---|---|---|---|---|---|
| 3,688,599 | A | * | 9/1972 | St. Germain | 74/526 |
| 3,982,446 | A | * | 9/1976 | Van Dyken | 74/488 |
| 4,060,008 | A | * | 11/1977 | Wilkinson | 74/488 |
| 4,137,793 | A | * | 2/1979 | Sowell | 74/488 |
| 4,256,197 | A | * | 3/1981 | Kiser | 180/335 |
| 4,630,703 | A | * | 12/1986 | Fletcher | 180/219 |
| 4,838,113 | A | * | 6/1989 | Matsushima et al. | 74/551.8 |
| 4,875,386 | A | * | 10/1989 | Dickerson | 74/551.9 |
| 4,895,044 | A | * | 1/1990 | Ekins | 74/551.9 |
| 5,347,835 | A | * | 9/1994 | Dewey | 70/202 |
| 5,775,167 | A | * | 7/1998 | Maietta | 74/480 R |
| 6,135,227 | A | * | 10/2000 | Laning | 180/170 |
| 6,167,776 | B1 | * | 1/2001 | Cossette | 74/488 |
| 6,276,230 | B1 | * | 8/2001 | Crum et al. | 74/551.9 |
| 2002/0124680 | A1 | * | 9/2002 | Sjodin | 74/526 |

FOREIGN PATENT DOCUMENTS

| | | | | |
|---|---|---|---|---|
| DE | 29806919 | * | 8/1998 | 74/489 |
| JP | 10-47089 | * | 2/1998 | 74/526 |

* cited by examiner

*Primary Examiner*—Vinh T. Luong
(74) *Attorney, Agent, or Firm*—Joe D. Calhoun

(57) ABSTRACT

An apparatus for throttling a vehicle equipped with an exterior throttle lever actuated near a handlebar, said throttling via actuation caused by rotation of said apparatus around the longitudinal axis of the handlebar rather than by direct personal actuation of the throttle lever, said rotational throttling apparatus including a finger-like projection extending from a rotatable sleeve near the throttle lever.

16 Claims, 2 Drawing Sheets

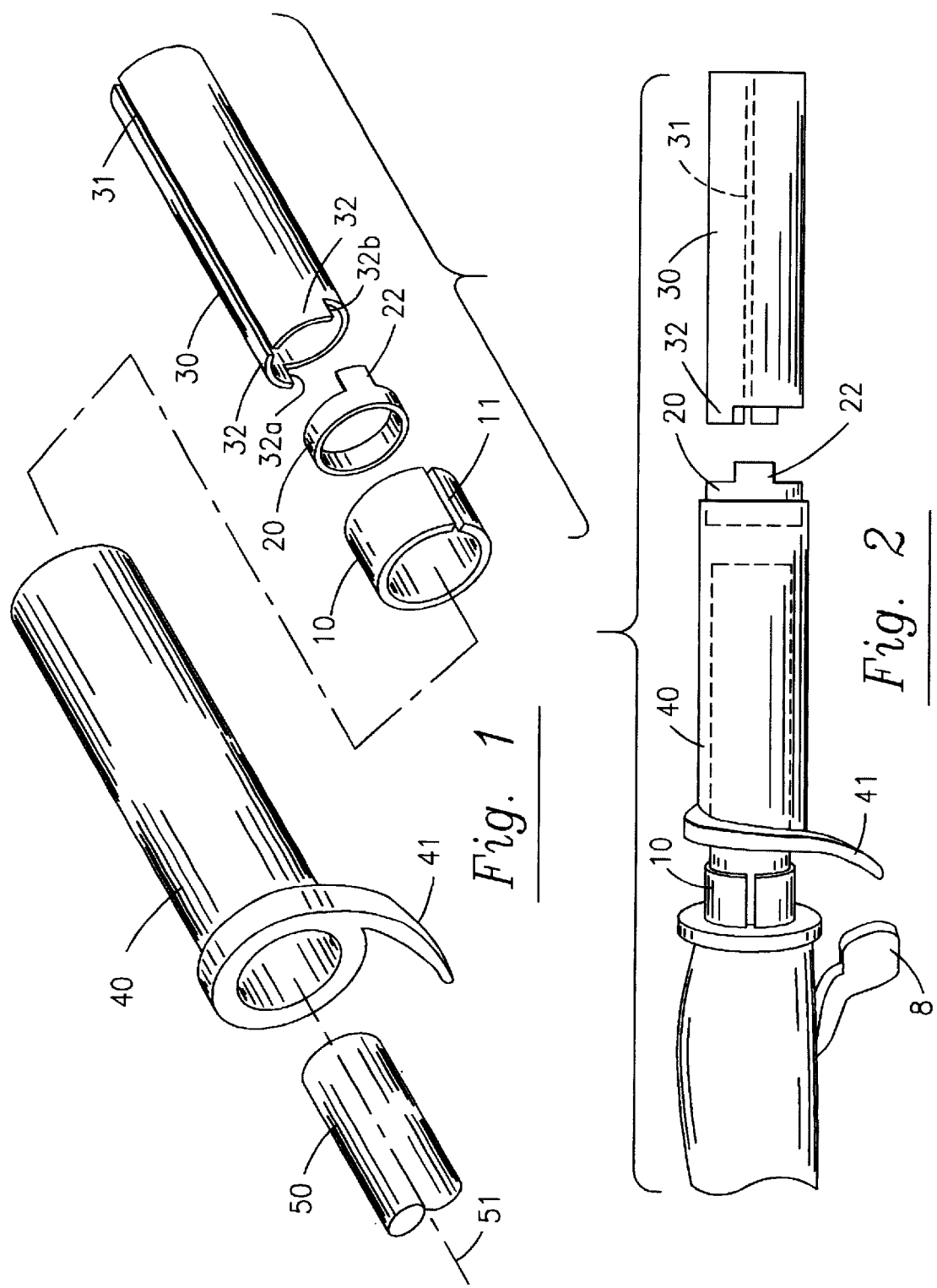

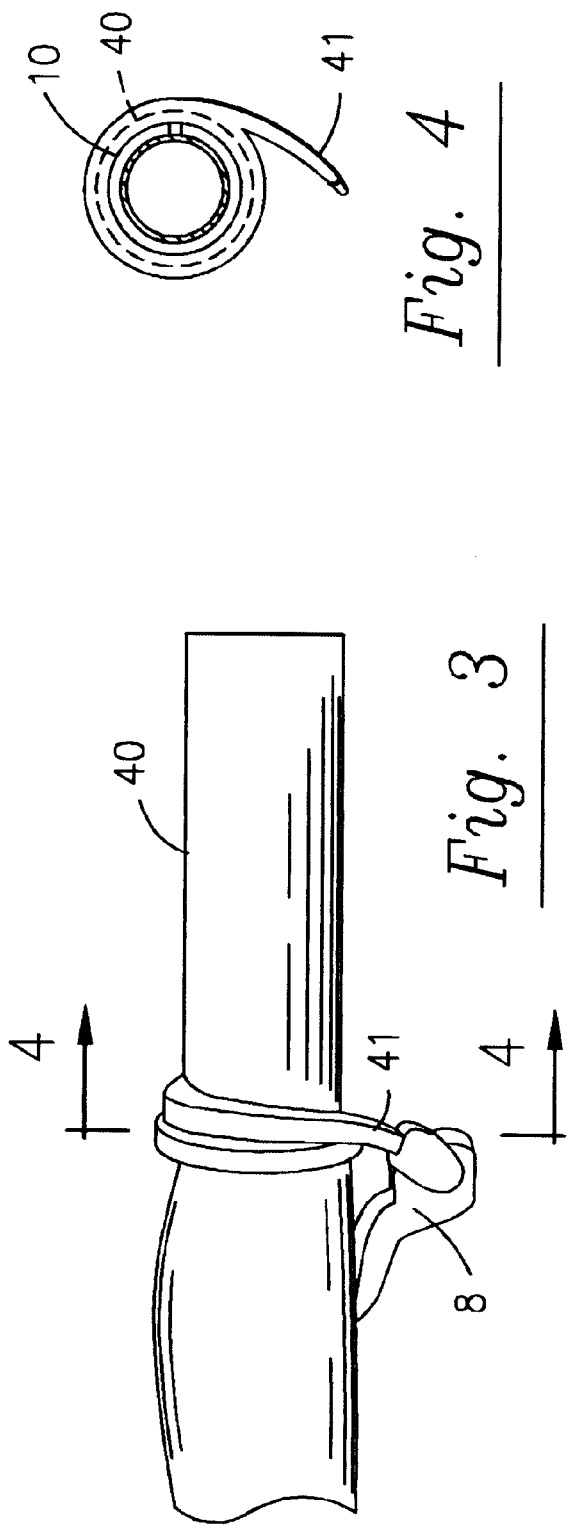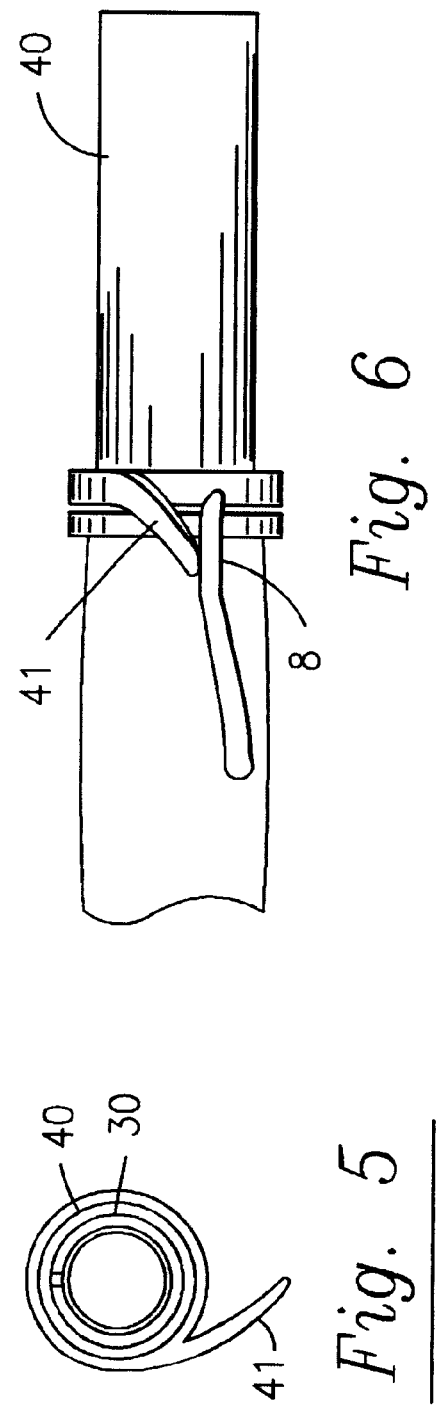

LEVER THROTTLE CONVERTER

BACKGROUND OF THE INVENTION (1) Field of the Invention

This invention generally relates to auxiliary throttles for vehicles equipped with an exterior throttle lever actuated near a handlebar. More particularly, this invention relates to an apparatus for indirectly throttling such vehicles, via actuation caused by rotation of said apparatus around the longitudinal axis of the handlebar rather than by direct personal actuation of the throttle lever.

(2) Description of the Related Art Including Information Disclosed Under 37 C.F.R. 1.97 and 1.98.

Virtually all gasoline-powered vehicles have an engine throttling system controlling how fast the engine pistons move, thereby controlling the speed of the vehicle. Although the throttling system culminates at the engine, often it is actuated remotely, outside the vehicle engine compartment, by way of a cabling and/or levering system. The throttling system of many vehicles is actuated near the steering mechanism, for relatively easy access by the rider. Typically, the throttling system is actuated by depression or other movement of a lever on or near the steering mechanism, such as one of the handlebars. For example, vehicles such as an all terrain vehicle ("ATV"), snowmobile or personal watercraft have a lever on or near the handlebar (usually the right-side handlebar) within close proximity to the rider's thumb or other finger. Upon ignition of the engine, it usually idles at an established relatively low rpm (revolutions per minute); a spring in the throttling system, acting against the throttle-lever, typically biases the lever to rest in the idle position. Movement of that lever by the thumb or other finger (often in a counter-clockwise direction, when viewed from the end of the right handlebar), overcoming that spring-biasing, will cause the engine to operate at a higher rpm level, which usually means that the vehicle will travel faster (if it is in gear rather than disengaged in neutral). For safety reasons, such throttling systems are installed by the manufacturer to be safe and durable. They are also often protected against tampering, which may undermine their safe functioning and impair warranties.

The finger force required to overcome that spring-biasing is not usually a great amount of force at any particular instant, but continuous throttling over a relatively long duration may cause fatigue to the finger muscles of the rider. This is especially true if the rider is relatively young, old, weak or infirm. Moreover, many vehicles are operated for relatively long durations under weather conditions that foster fatigue. For example, many ATVs or snowmobiles are operated in extremely cold weather, and over very rugged terrain; these conditions may exert much strain on the rider's muscles, thereby facilitating fatigue. Cramping or fatigue of the rider's throttling muscles may hamper the proper steering of the vehicle and/or its proper throttling. For health and safety reasons, it would be advantageous to have a device allowing throttling of finger-throttled vehicles by wrist rotation around the handlebar.

The following patents are known, and arguably related to the present invention:

| U.S. Pat. No. | 1st Inventor | Date |
|---|---|---|
| 6,167,776 | Cossette | Jan. 2, 2001 |
| 5,775,167 | Maietta | Jul. 7, 1998 |
| 5,461,936 | Bulkeley | Oct. 31, 1995 |
| 5,370,017 | Krauer | Dec. 6, 1994 |
| 5,00,674 | Piatt | Apr. 9, 1991 |
| 4,286,699 | Pawelka | Sep. 1, 1981 |

The Maietta finger-throttle is actuated after the thumb-throttle lever is released (causing the thumb-throttle lever to spring back to its un-throttled idle position). The Maietta throttle is actuated when the non-thumb fingers capture the finger-throttle lever (resting vertically upstanding and perpendicular to the handlebar) and move it to a position essentially parallel and adjacent to the handlebar gripped by the user. Attachment of the Maietta finger-throttle is accomplished by essentially inserting it into the linkage between the thumb-throttle lever and the engine throttle mechanism, requiring some dismantling of the factory-installed throttling system.

The throttle disclosed in Cossette is a second, auxiliary thumb-throttle mounted below and behind the handlebar grip (rather than above and behind the grip, like the primary factory-installed thumb-throttle). Attachment of the Cossette thumb-throttle is accomplished by essentially adding it onto the end of the linkage from the primary thumb-throttle lever and the engine throttle mechanism, requiring some dismantling of the factory-installed throttling system.

BRIEF SUMMARY OF THE INVENTION

In the most general form, the present invention is essentially a sleeve capable of rotatable mounting around the handlebar of any vehicle equipped with an exterior throttle lever actuated near a handlebar. The present invention substitutes a rigid finger-like projection for the rider's thumb or other actuating appendage. By rotating the sleeve around the handlebar over which it is mounted, the finger-like projection contacts the throttle lever and thereby facilitates throttling of the vehicle.

One primary object of the present invention is to provide an apparatus for (and method of) converting an exterior-lever throttling system into one actuated by rotation around a handlebar axis.

Another primary object of the present invention is to provide an exterior-lever throttle convertor that can be readily installed without dismantling or otherwise interrupting the integrity of the factory-installed exterior-lever throttling system.

Another object of the invention is to provide an exterior-lever throttle convertor that has a minimum of separate parts, that is inexpensive to manufacture, and that can be quickly and easily installed.

Other objects of the invention will become apparent from a full review of this application.

BRIEF DESCRIPTION OF THE SEVERAL VIEWS OF THE DRAWINGS

FIG. 1 depicts a perspective view from above and behind the invention (and vehicle handlebar, unnumbered), with three of the basic parts or features aligned as they would be positioned within an auxiliary sleeve having a finger-like projection, wherein the rotatable sleeve is stationed around (or integrated into the design of) the interior wall of the auxiliary sleeve, and with the inner bushing and outer bushing stationed around the vehicle handlebar rotatably ensleeved by the auxiliary sleeve (with rotatable sleeve suitably stationed within, or integrated into the design thereof) is slipped over the handlebar end and positioned so that the proximal edge of the rotatable sleeve is in close proximity to the distal edge of the inner bushing; the outer bushing is the pushed over the handlebar end and stationed so that its proximal extension is positioned to cooperatively mate with a distal extension of the rotatable sleeve, to govern at least the amount of return rotation of the finger-like projection (when in contact with the vehicle's throttle lever) from the throttled position to the resting idle position.

FIG. 2 depicts an elevation view (from behind the invention and handlebar) of a proximal bushing stationed around a handlebar near the vehicle's throttle lever, with the auxiliary sleeve partially slipped over the handlebar end, with the rotatable sleeve (broken lines) stationed around the inner surface of the auxiliary sleeve (or integrated into the design thereof), and with distal bushing awaiting positioning for stationing around the handlebar end.

FIG. 3 depicts an elevation view (from behind the invention and handlebar) of one version of the invention installed on an ATV's handlebar, with a finger-like projection of an auxiliary sleeve contacting the vehicle's throttle lever to commence actuation thereof via rotation of the invention around the handlebar; broken lines indicate the stationing of rotatable sleeve around the inner wall of the auxiliary sleeve, or the integration of the rotatable sleeve into the design of the auxiliary sleeve.

FIG. 4 depicts an elevation cross section view from the proximal end of the invention, sectioned at 4—4 of FIG. 3.

FIG. 5 depicts an elevation view from the distal end of the invention.

FIG. 6 depicts a plan view from beneath, looking directly up at the invention.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

The claims of this invention are to be read to include any legally equivalent device or method. Before the present invention is described in detail, it is to be understood that the invention is not limited to the particular configurations, process steps and materials disclosed herein. It is also to be understood that the terminology used herein is not intended to be limiting, since the scope of the present invention will be limited only by the claims and equivalents thereof. The invention is not limited by construction materials, to the extent that such materials satisfy the structural or functional requirements; for example, any materials may be used to make the tethering means so long as the materials fulfill the requirements that said materials provide the desired or necessary amount of biasing. For the sake of simplicity and to give the claims of this patent application the broadest interpretation and construction possible, the following definitions will apply to this application:

1. The word "axial" or derivative thereof means along or related to a longitudinal axis of an identified item or element; for example, a handlebar often has an essentially cylindrical cross-section, essentially surrounding a central axis extending lengthwise along the handlebar.
2. The words "distal" or "outer", or derivatives thereof, mean relatively distant (or further) from the handlebar juncture with the main body of the vehicle; nearer to the free end or tip of the handlebar, relative to another specified item or feature.
3. The words "proximal" or "inner", or derivatives thereof, mean relatively closer to the handlebar juncture with the main body of the vehicle; further from the free end or tip of the handlebar, relative to another specified item or feature.
4. The word "bushing" or derivative thereof means a fixed or movable collar or lining used to constrain, guide, reduce friction and/or facilitate the smooth rotation of an adjacent part.
5. The word "sleeve" or derivative thereof means an encasement into or through which an object fits; although sleeve often connotes an encircling encasement having relatively greater length (than, for example, a collar), the precise length of the sleeve of the present invention (relative to any other item or element) need not be so limited unless so stated.
6. The word "stationary" or derivative thereof means fixed; not moving, at least temporarily, while the invention is functioning as intended.
7. The word "elastomeric" or derivative thereof means returning, or exerting a force toward returning, to an initial resting state or form (after deformation) and remaining stationary by means of such return force and frictional contact with any underlying surface.

Likewise, when the plural form is used, it may be taken to include the singular form, and vice versa. Similarly, the conjunctive "and" used in the written description may also be taken to include the disjunctive "or" in the written description, and vice versa, for the sake of simplicity and whenever necessary to give the claims of this patent application the broadest interpretation and construction possible.

One basic version of the invention has three essential parts: 1. a proximal (or inner) bushing; 2. a rotatable sleeve with a finger-like projection; and 3. a rotation-limiting distal (or outer) bushing. The bushings may be constructed of materials having elastic qualities, and include a split (along its entire axial length, preferably through any extension) allowing each bushing to be temporarily flexed apart and slipped over handlebars of varying diameter. The bushings described herein may be resiliently rigid, and may be made of any material enabling the part to be urged apart and later return to its original resting position. Some such material are expressly identified herein, but the resilient elements of the invention may additionally be constructed, in whole or in relevant part, of similar materials that are either not named herein or not yet invented. Examples of acceptable construction materials include elastomeric members of the group including polyvinyl chloride (PVC), styrene-butadiene, thermoplastic elastomers, polycarbonate material such as (for example) plastic, nylon, polyurethane and polyetheline, and combinations thereof. One of the important characteristics common to each of said members in said particular group, supporting the inclusion of each member in said particular group, is that each has sufficient elasticity for returning, or exerting a force toward returning, to an initial resting state or form (after deformation) and remaining stationary by means of such return force and frictional contact with any underlying surface. Another common characteristic is that each has sufficient durability, to continue functioning without warping, rusting, binding, breaking or otherwise failing to substantially perform the intended bushing and/or sleeve functions. In one preferred embodiment, the diameter of the handlebar is larger than that of each bushing in its un-flexed resting position, so that each bushing's tendency to return to its resting position facilitates the stationary positioning of the bushing at the proper place along the handlebar.

Part 1 is essentially an inner bushing, which is slipped over the handlebar and fixed into place near the throttle-lever housing. When the invention is properly installed on the vehicle, this stationary proximal bushing will act as a friction-reducing buffer between the rotatable sleeve and the vehicle's throttle-lever housing. The inner bushing will also prevent the rotatable sleeve from sliding proximally out of cooperating relationship with the throttle lever.

Part 2 is essentially a rotatable sleeve with a finger-like projection which, when the invention is properly installed on the vehicle, projects externally past the sleeve's proximal edge in cooperating relationship with the throttle-lever of the vehicle. In one preferred embodiment of the invention, the sleeve is essentially a hollow cylinder about as long as the distance from the distal edge of the inner bushing to the proximal edge of the outer bushing, with a finger-like projection projecting externally and proximally a sufficient distance for cooperating contact with the vehicle's throttle-lever. The distal edge of the sleeve includes an extension extending distally a distance sufficient to facilitate a cooperative relationship with a proximal extension from the proximal edge of the outer bushing, when the outer bushing is properly mounted around the handlebar. The rotatable sleeve (preferably having a diameter slightly larger than the vehicle handlebar) is slipped over the handlebar, with its regular proximal edge essentially adjacent to the regular distal edge of the inner bushing (already stationed around the handlebar essentially adjacent to the throttle-lever housing), allowing free rotation of the rotatable sleeve around the handlebar.

Part 3 is essentially a stationary rotation-limiting outer bushing, interacting with the rotatable sleeve to allow said sleeve to rotate around the handlebar only a desired degree of rotation. This distal bushing also prevents the finger-like projection from sliding distally out of cooperating relationship with the throttle-lever; the outer bushing likewise prevents departure of the rotatable sleeve off the end of the handlebar. Ideally, the length and other attributes (especially the elastomeric features) will be sufficient to assure continuation of the outer bushing's primary functions of limiting preventing substantial disengagement of the finger-like projection from the throttle-lever upon returning to the idle throttling position, preventing lateral disengagement of the projection from the throttle-lever, and preventing lateral departure of the apparatus from the handlebar end until desired. The proximal edge of the outer bushing includes an extension extending proximally a distance sufficient to facilitate a cooperative relationship with a distal extension from the distal edge of the sleeve, when both the distal bushing and sleeve are properly mounted around the handlebar. After the rotatable sleeve was slipped over the handlebar with its proximal edge essentially adjacent to the distal edge of the inner bushing (already stationed around the handlebar next to the throttle-lever housing), the outer bushing (with its proximal projection edge leading) is slipped over the handlebar and stationed essentially adjacent to the distal edge of the sleeve.

The degree of rotation of the sleeve around the handlebar is governed by the relative positioning of both cooperating extensions of the sleeve and the outer bushing. The cooperating relationship between the extensions comprises the degree of allowable axial rotation (or range of motion) of the rotatable sleeve distal extension (and proximal projection), between stops defined by each longitudinal side of a proximal extension (32) of the outer bushing. Ideally, said stops may be defined by each longitudinal side (32a and 32b) of a proximal extension, positioned (relative to the rotatable sleeve distal extension) corresponding to the idle position of the vehicle throttle-lever, and to the vehicle's maximum desirable throttling level. On one hand, to prevent the finger-like projection from losing contact with the vehicle throttle-lever upon returning to the idle resting position, the outer bushing's proximal extension is stationed so that it will prevent further return rotation of the sleeve's distal extension around the handlebar. With the rotatable sleeve properly installed between both stationary bushings, the cooperating extensions may also allow rotation of the rotatable sleeve (and corresponding depression of the throttle-lever) only the maximum allowable distance, to prevent damage to the throttle-lever (or excessive speed) due to excessive actuation of the throttle-lever.

One aspect of the invention includes an apparatus for throttling a vehicle equipped with an exterior throttle lever actuated near a handlebar (50), said throttling via actuation caused by rotation of said apparatus around the longitudinal axis (51) of the handlebar rather than by direct personal actuation of the throttle lever. In one general embodiment, said rotational throttling apparatus comprises means for stationing a sleeve essentially axially encircling the handlebar, said sleeve rotatable around the handlebar. Moreover, said rotatable sleeve has an external projection in cooperating relationship with the vehicle's exterior throttle lever, for actuating same. This projection should have sufficient rigidity to successfully push the throttle-lever from its idle position to the desire level of throttling, against the throttling system's spring-biasing usually urging the throttle-lever back to its resting idle position. The proximal edge of the rotatable sleeve, from which the projection projects, may include addition thickness for additional strength. The amount of desired rotation is suggested to be no more than the maximum amount of throttling possible without damaging the vehicle or injuring the rider.

Said stationing means may include a proximal bushing and a distal bushing. Between said bushings, said rotatable sleeve may include a finger-like projection projecting externally and proximally a sufficient distance for cooperating contact with the vehicle's throttle lever; said sleeve may further include a distal edge including an extension extending distally a sufficient distance for cooperating relationship with said distal bushing.

A more specific embodiment of said apparatus includes a proximal bushing comprising a collar sized for stationing around the handlebar. In this version, said sleeve may include a collar sized for rotation around the handlebar; said distal bushing may include a collar sized for stationing around a handlebar. Since handlebars typically have a circular cross section, the bushings and rotary sleeve will have inner cavities capable of attaining a circumference slightly larger (at least in an expanded, non-resting position) that the outer circumference of the handlebar over which each is stationed or mounted. The rotatable sleeve will ideally have an inner cavity having a circumference always slightly larger than the outer circumference of the handlebar which it is mounted around, to allow rotation thereabouts. The inner surface of the rotatable sleeve may be configured as if the rotatable sleeve identified above as "Part 2" (absent the finger-like projection) is integrally included in its design. In other words, item 20 of FIG. 1 is anchored within item 40 of FIG. 1, or integrally included within the design of the inner surface of item 40, essentially in the positioning depicted in FIG. 3. The inner surface of this particular version of the rotatable sleeve therefore includes an intermediate inwardly-raised extension (comparable to that of the distal edge of the Part 2 version of the rotatable sleeve), extending distally a distance sufficient to facilitate a cooperative relationship with a proximal extension from the proximal edge of the outer bushing, when the outer bushing is properly mounted around the handlebar. The inner surface of this particular version of the rotatable sleeve therefore also includes an intermediate inwardly-raised regular portion around its inner circumference (comparable to that of the proximal edge of the Part 2 version of the rotatable sleeve), extending to cooperate with the regular distal edge of the inner bushing (already stationed around the handlebar essentially adjacent to the throttle-lever housing), allowing free rotation of the rotatable sleeve around the handlebar.

Stationing of the bushings to the underlying handlebar may be accomplished by virtually any means of affixation. Examples of acceptable means include adhesives, wedging, clamping, screwing, bolting and elastomeric affixation, and combinations thereof. One of the important characteristics common to each of said members in said group, supporting the inclusion of each member in said particular group, is that each has the ability to fix a bushing into place on the handlebar, allowing the bushing to restrain the movement of the rotary collar in its respective direction.

In one prototype of the invention, each of said bushings comprises a rigidly elastomeric material with an axial split transversing its length. This allows the bushing to increase its circumference while it is being urged over the larger handlebar and urged into place thereon; the elasticity causes the bushing to try to return to its natural resting configuration with a smaller circumference, and thereby essentially acts as a natural clamp to station the bushing on the handlebar through friction contact with any underlying surface. Said rigidly elastomeric material may include members selected from the group consisting of polyvinyl chloride (PVC), styrene-butadiene, thermoplastic elastomers, polycarbonate material such as (for example) plastic, nylon, polyurethane and polyetheline, and combinations thereof. Ideally, said split occurs along the longitudinal axis including the proximal extension of the proximal edge of the outer bushing; this will assure that the distal extension of the rotatable sleeve will have a cooperating relationship with an unsplit proximal edge of the outer bushing, to avoid friction or "catching" against the comers of the split edge.

When properly installed, the three parts cooperate to assure that rotation of the sleeve (and accompanying finger-like projection) actuates the throttle-lever only within the desired degree of rotation (range of motion). Said cooperating relationship comprises the degree of allowable axial rotation of said rotatable sleeve distal extension, between stops defined by each longitudinal side of a proximal extension. Although the stops may be positioned to allow any desired range of motion and accompanying level of throttling), ideally said stops may be defined by each longitudinal side of a proximal extension correspond to the idle position of the vehicle throttle-lever and the vehicle's maximum desirable throttling level.

The preferred embodiment comprises a proximal bushing (10) essentially stationed axially encircling the vehicle handlebar in close proximity to its exterior throttle-lever (8). A rotatable sleeve (20) having a distal edge is essentially axially encircling the handlebar distally adjacent to said proximal bushing, the distal edge of said sleeve including an extension (22) extending distally a sufficient distance for cooperating rotation-limiting relationship with a distal bushing (30). A distal bushing having a proximal edge is essentially stationed axially encircling the handlebar essentially adjacent to the distal edge and extension of said sleeve, said proximal edge including an extension (32) extending proximally a distance sufficient to facilitate a cooperative rotation-limiting relationship with a distal extension from the distal edge of said sleeve. There is also an auxiliary sleeve (40) having a proximal edge and further comprising a finger-like projection (41) projecting externally and proximally therefrom a sufficient distance for cooperating contact with the vehicle's throttle-lever; said auxiliary sleeve is sized for rotatable mounting around said bushings around the handlebar. Said rotatable sleeve is stationed within said auxiliary sleeve and positioned to maintain said cooperative contact of said projection with the vehicle throttle-lever, and to maintain said cooperative rotation-limiting relationship. The proximal edge of the inner bushing should extend proximally past the proximal edge of the auxiliary sleeve, to prevent the sleeve from entering into frictional contact with the adjacent throttle-lever housing as the sleeve rotates. The distal edge of the outer bushing should not extend distally out past the distal edge of the auxiliary sleeve; otherwise, the outer bushing may be an unwanted source of stationary frictional contact with any rubber handlebar grip or glove the user may use in conjunction with the invention.

This preferred embodiment may include any or all of the features of the other versions of the invention described previously.

Besides the above described versions of the invented apparatus, the invention further includes a method of installing an apparatus for throttling a vehicle equipped with an exterior throttle-lever actuated near a handlebar, said throttling via actuation caused by rotation of said apparatus around the longitudinal axis of the handlebar rather than by direct personal actuation of the throttle lever. Said method comprises the steps of stationing an inner bushing around the handlebar, mounting an auxiliary sleeve (having a rotatable sleeve suitably stationed therein) over the handlebar end (and positioned so that a proximal edge of said rotatable sleeve is in close proximity to a distal edge of said proximal bushing), and stationing a distal bushing on the handlebar (having a proximal extension positioned to cooperatively mate with said distal extension of said rotatable sleeve) to govern at least the amount of return rotation of said projection when in contact with the vehicle throttle-lever.

A stationing step may also include parting an axial split transversing the length of a rigidly elastomeric collar having an inner cavity circumference slightly smaller than the outer circumference of the handlebar over which said bushing is stationed, then urging said bushing to the desired station and allowing said bushing to return to its resting position. Also included is stationing said distal bushing around the handlebar comprising parting an axial split transversing the length of a rigidly elastomeric collar having an inner cavity circumference slightly smaller than the outer circumference of the handlebar over which said bushing is stationed, urging said bushing to the desired station for cooperating relationship with said rotary sleeve, and allowing said bushing to return to its resting position.

Besides the above described installation method, the invention includes a method of throttling a vehicle, equipped with a handlebar throttle-lever, via actuation caused by rotation around the longitudinal axis of the handlebar rather than by direct actuation of the handlebar throttle-lever. Said method comprises, after installing an apparatus described herein, the step of rotating said apparatus around the vehicle handlebar.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. An apparatus for throttling a vehicle equipped with an exterior throttle lever actuated near a handlebar, said throttling via actuation caused by rotation of said apparatus around the longitudinal axis of said handlebar rather than by direct personal actuation of the throttle lever, said rotational throttling apparatus comprising:
   means for stationing an auxiliary sleeve essentially axially encircling said handlebar, said sleeve rotating around the handlebar; and
   said rotating sleeve having an external projection in cooperating contact with the vehicle's exterior throttle lever, for actuating same, said stationing means comprising a proximal bushing and a distal bushing; and
   between said bushings, said rotating sleeve comprising an auxiliary sleeve having a finger projection projecting externally and proximally a sufficient distance for said cooperating contact with the vehicle's throttle lever, said sleeve further comprising a distal edge including an extension extending distally a sufficient distance for establishing a cooperating relationship with said distal bushing.

2. An apparatus described in claim 1 hereinabove, said proximal bushing comprising a first collar sized for stationing around said handlebar, said sleeve comprising a second collar sized for rotation around said handlebar, said distal bushing comprising a third collar sized for stationing around said handlebar.

3. An apparatus described in claim 2 hereinabove, wherein said stationing includes members selected from the groups consisting of adhesives, wedging, clamping, screwing, bolting and elastomeric affixation, and combinations thereof.

4. An apparatus described in claim 3 hereinabove, each of said bushings comprising rigidly elastomeric material with an axial split transversing its length.

5. An apparatus described in claim 4 hereinabove, wherein said rigidly elastomeric material includes members selected from the group consisting of polyvinyl chloride (PVC), styrene-butadiene, thermoplastic elastomers, and polycarbonate material, plastic, nylon, polyurethane and polyetheline, and combinations thereof.

6. An apparatus described in claim 1 hereinabove, wherein said cooperating relationship comprises the degree of allowable axial rotation of a distal extension of said rotating sleeve, between stops defined by each longitudinal side of said proximal extension of said distal bushing.

7. An apparatus described in claim 6 hereinabove, wherein said stops defined by each longitudinal side of said proximal extension correspond to the idle position of the vehicle throttle-lever and the vehicle's maximum desirable throttling level.

8. An apparatus for throttling a vehicle equipped with an exterior throttle lever actuated near a handlebar, said throttling via actuation caused by rotation of said apparatus around the longitudinal axis of said handlebar rather than by direct personal actuation of the throttle lever, said rotational throttling apparatus comprising:
   a proximal bushing essentially stationed axially encircling said vehicle handlebar in close proximity to its exterior throttle-lever;
   a rotating sleeve having a distal edge and essentially axially encircling said handlebar distally adjacent to said proximal bushing, the distal edge of said sleeve including an extension extending distally a sufficient distance for cooperating rotation-limiting relationship with a distal bushing;
   a distal bushing having a proximal edge and essentially stationed axially encircling said handlebar essentially adjacent to the distal edge and extension of said sleeve, said proximal edge including an extension extending proximally a distance sufficient to facilitate a cooperative rotation-limiting relationship with a distal extension from the distal edge of said sleeve; and
   an auxiliary sleeve having a proximal edge and further comprising a finger projection projecting externally and proximally therefrom a sufficient distance for cooperating contact with the vehicle throttle-lever, said auxiliary sleeve sized for rotating mounting around said bushings around said handlebar, said rotating sleeve stationed within said auxiliary sleeve and positioned to maintain said cooperative contact and to maintain said cooperative rotation-limiting relationship.

9. An apparatus described in claim 8 hereinabove, said stationing means comprising a proximal bushing and said distal bushing; and
   between said bushings, said rotating sleeve comprising a distal edge including an extension extending distally a sufficient distance for said cooperating relationship with said distal bushing.

10. An apparatus described in claim 9 hereinabove, said proximal bushing comprising a first collar sized for stationing around said handlebar, said sleeve comprising a second collar sized for rotation around said handlebar, said distal bushing comprising a third collar sized for stationing around said handlebar.

11. An apparatus described in claim 10 hereinabove, wherein said stationing includes members selected from the groups consisting of adhesives, wedging, clamping, screwing, bolting and elastomeric affixation, and combinations thereof.

12. An apparatus described in claim 11 hereinabove, each of said bushings comprising rigidly elastomeric material with an axial split transversing its length.

13. An apparatus described in claim 12 hereinabove, wherein said rigidly elastomeric material includes members selected from the group consisting of polyvinyl chloride (PVC), styrene-butadiene, thermoplastic elastomers, polycarbonate material, plastic, nylon, polyurethane and polyetheline, and combinations thereof.

14. An apparatus described in claim 8 hereinabove, wherein said cooperating relationship comprises the degree of allowable axial rotation of a distal extension of said rotating sleeve, between stops defined by each longitudinal side of said proximal extension of said distal bushing.

15. An apparatus described in claim 14 hereinabove, wherein said stops defined by each longitudinal side of said proximal extension correspond to the idle position of the vehicle throttle-lever and the vehicle's maximum desirable throttling level.

16. An apparatus described in claim 8 hereinabove, said rotating sleeve integrated within the design of the inner wall of said auxiliary sleeve and positioned to maintain said cooperative contact and to maintain said cooperative rotation-limiting relationship.

* * * * *